(12) United States Patent
Gruben et al.

(10) Patent No.: US 7,418,862 B2
(45) Date of Patent: Sep. 2, 2008

(54) ELECTROMECHANICAL FORCE-MAGNITUDE, FORCE-ANGLE SENSOR

(75) Inventors: Kreg George Gruben, Stoughton, WI (US); Matthew Wade Schmidt, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 193 days.

(21) Appl. No.: 11/297,911

(22) Filed: Dec. 9, 2005

(65) Prior Publication Data

US 2007/0137307 A1 Jun. 21, 2007

(51) Int. Cl.
*A61B 5/22* (2006.01)
(52) U.S. Cl. .................. 73/379.07; 74/594.4; 482/8
(58) Field of Classification Search ............ 73/774, 73/379.06, 379.07; 74/594.4; 280/294; 482/80, 482/1–9

See application file for complete search history.

(56) References Cited

U.S. PATENT DOCUMENTS

| | | | | |
|---|---|---|---|---|
| 3,760,653 A | * | 9/1973 | Hagenah | 74/594.4 |
| 3,798,997 A | * | 3/1974 | Konzorr | 74/594.4 |
| 4,463,433 A | * | 7/1984 | Hull et al. | 702/41 |
| 4,765,315 A | * | 8/1988 | Krukowski | 601/32 |
| 4,873,890 A | * | 10/1989 | Nagano | 74/594.4 |
| 4,882,946 A | * | 11/1989 | Beyl | 74/594.6 |
| 5,027,303 A | * | 6/1991 | Witte | 702/44 |
| 5,165,278 A | * | 11/1992 | Huszczuk et al. | 73/379.06 |
| 5,202,627 A | * | 4/1993 | Sale | 324/166 |
| 5,695,431 A | * | 12/1997 | Bond et al. | 482/1 |
| 5,992,553 A | * | 11/1999 | Morrison | 180/206 |
| 6,808,472 B1 | * | 10/2004 | Hickman | 482/8 |
| 2005/0107221 A1 | * | 5/2005 | Vohryzka | 482/57 |
| 2005/0209056 A1 | * | 9/2005 | Daly et al. | 482/52 |

FOREIGN PATENT DOCUMENTS

| | | | |
|---|---|---|---|
| DE | 4227586 A1 | * | 2/1994 |
| DE | 29611344 U1 | * | 11/1996 |

OTHER PUBLICATIONS

Kreg G. Gruben, Citlali Lopez-Ortiz, Matthew W. Schmidt, The control of foot force during pushing efforts against a moving pedal, Exp. Brain Res (2003) 148:50-61.
L. M. Rogers, D. A. Brown, K. G. Gruben, Foot force direction control during leg pushes against fixed and moving pedals in persons post-stroke, Gait and Posture 19, (2004) 58-68.
Kreg G. Gruben, Citlali Lopez-Ortiz, Characteristics of the Force Applied to a Pedal During Human Pushing Efforts: Emergent Linearity, Journal of Motor Behavior, 2000, vol. 32, No. 2, 151-162.
Kreg G. Gruben, Lynn M. Rogers, Matthew W. Schmidt, Liming Tan, Direction of Foot Force for Pushes Against a Fixed Pedal: Variation With Pedal Position, Motor Control 2003, 362-377, 2003 Human Kinetics Publishers, Inc.

\* cited by examiner

*Primary Examiner*—Edward Lefkowitz
*Assistant Examiner*—Punam Patel
(74) *Attorney, Agent, or Firm*—Boyle Fredrickson, S.C.

(57) ABSTRACT

An electromechanical force sensor uses a rotating element that aligns with the force and may carry a force magnitude sensor simplifying and providing more accurate measurement of force-angle and force-magnitude. The ability to detect simply force-angle and force-magnitude enables a variety of training and exercise devices.

14 Claims, 4 Drawing Sheets

ELECTROMECHANICAL FORCE-MAGNITUDE, FORCE-ANGLE SENSOR

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to force sensors, and in particular, to an electromechanical force sensor measuring both force magnitude and angle.

Force sensors, such as strain gauges attached to an elastic carrier, are well known in the art for producing an electrical signal proportional to force. Generally, strain gauges provide a change of resistance as the conductive material of the strain gauge is stretched or compressed. Strain gauges are designed to be sensitive principally along a single axis and will be termed "single axis sensors" producing a magnitude and sign of force in one dimension.

The measurement of force magnitude and direction in two or more dimensions (angle) may be accomplished by placing a number of single axis sensors along different orthogonal axes. Each sensor provides a vector component of the force which may be summed to produce a single vector in multiple dimensions.

Measurement of force magnitude and angle may be desirable in certain therapeutic and/or exercise equipment where knowledge of not only how hard a user is pushing, for example, on the pedal of a stationary bike, but also the angle in which the user is pushing can be important in providing the user with feedback for therapy or training or in providing sophisticated control of the training device.

Extraction of force angle from multiple, single-axis sensors is difficult, requiring accurate alignment and calibration of multiple sensors. Further, cross talk between sensors, caused by their sensitivity to off-axis forces, introduces error in force angle when derived by this method.

SUMMARY OF THE INVENTION

The present invention provides an electromechanical force angle, force magnitude sensor using an eccentrically rotating mechanical element to detect the force angle. A single axis sensor, such as a strain gauge, mounted on the rotating element is always aligned with the force, and so may be used to measure force magnitude. In one application, this simple method of measuring force magnitude and force angle can be incorporated into training equipment to allow muscle activation patterns to be deduced for superior user feedback.

Specifically then, the present invention provides a sensor for measuring a force magnitude and force angle of a force acting on a member. The sensor includes a rotating element mounted on the member to rotate according to a force angle of a force supplied through the rotating element to the member. A rotation sensor provides an electronic measurement of the rotation of the rotating element to reveal the force angle, and the force sensor provides a measurement of the force magnitude of the force.

Thus, it is an object of at least one embodiment of the invention to provide a mechanical element for measuring force angle. The rotating element moves like a weathervane to always align with the force eliminating the need for complex vector mathematics or problems of sensor cross talk.

The force sensor may be a single axis force sensor mounted on the rotating element to rotate therewith.

Thus, it is an object of at least one embodiment of the invention to eliminate the need for multiple force sensors and calibration of those force sensors with each other by providing a single force sensor always aligned with the vector angle of the force.

The rotating element may have a first bearing along a first axis for receiving a shaft to rotate about the shaft along the first axis and may have a second bearing along a second axis parallel to, but displaced from, the first axis for rotating with respect to an operator about the second axis where the force is applied between the operator and the shaft.

Thus, it is an object of at least one embodiment of the invention to provide a simple mechanism that always aligns with the axis of a force through the use of displaced rotational axes which establish a torque when the axes are not aligned with the force angle.

The shaft may be attached to the member.

Thus, it is an object of at least one embodiment of the invention to provide a simple attachment of the present invention to devices such as stationary bicycles having shafts extending from bicycle crank arms.

The shaft may fit within a bore of an eccentric to form a first bearing and the eccentric may fit within the bore of the operator to form the second bearing.

Thus, it is an object of at least one embodiment of the invention to provide a mechanism that is extremely compact with each element fitting inside of the next.

The first bearing may provide at least two axially separated fulcrum points, and the second bearing may provide at least two axially separated fulcrum points so that one set of fulcrum points flanks the other.

Thus, it is an object of at least one embodiment of the invention to provide a "floating linkage" with reduced sensitivity to the particular point of loading of the operator along the axis.

The force sensor may be at least one strain gauge.

It is thus one object of at least one embodiment of the invention to provide a mechanism that may work with common and reliable force sensors.

The member may be the crank arm of a bicycle.

Thus, it is another object of at least one embodiment of the invention to provide a mechanism suitable for stationary bicycles and the like.

Generally, the present invention may enable a training device having a support for a user and a limb-engaging surface receiving a limb of the user when the user is positioned on the support. An actuator may control movement of the limb-engaging surface and the multi-axis force sensor may hold the limb-engaging surface with respect to the user's support. A position sensor may detect a position of the limb-engaging surface. A controller holding a kinematic model of the limb and communicating with the multi-axis force sensor and the position sensor measures an angle of applied force and the position of the limb-engaging surface, and uses the model to deduce a muscle activation pattern. The controller changes the movement of the limb-engaging surface through the actuator in response to the deduced muscle activation pattern.

Thus, it is an object of at least one embodiment of the invention to provide sufficient measurement of limb motion and force so as to deduce muscle activation patterns for feedback or control purposes.

These particular objects and advantages may apply to only some embodiments falling within the claims and thus do not define the scope of the invention.

BRIEF DESCRIPTION OF THE PREFERRED EMBODIMENT

Figure 1:
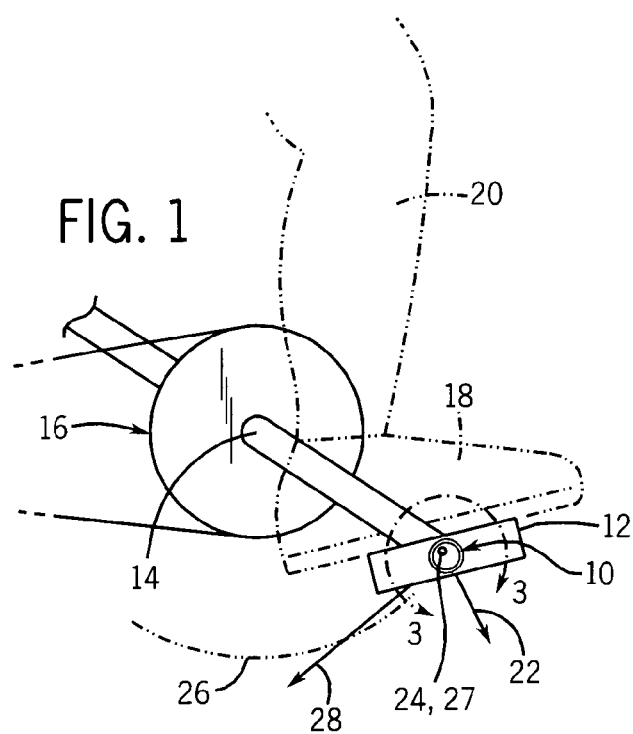
FIG. 1 is a side-elevational view of the crank of a stationary bicycle showing a pedal incorporating the sensor of the present invention.

Referring now to FIG. 1, the present invention provides a force sensor 10 that, in one embodiment, may fit within a pedal 12 of a stationary bicycle or the like. As is understood in the art, the pedal 12 may be attached to a crank arm 14 of a crank assembly 16. The crank assembly 16 also provides a second pedal and crank arm (not shown) so that two pedals may be engaged by a user's feet for exercise of the legs.

Specifically, a user's foot 18 may press upon the pedal 12 to provide a force 22 shown as a vector having a force angle and first axis 24 through the pedal, and a force magnitude shown as a length of the vector. The pedal 12 is constrained to a circular rotation path 26 by the operation of the crank assembly 16 and motion of the pedal 12 normally requires a component of the force 22 to project along vector 28 tangential to rotation path 26 at the first axis 24, but generally does not require alignment of vectors of forces 22 and 28.

Figure 3:
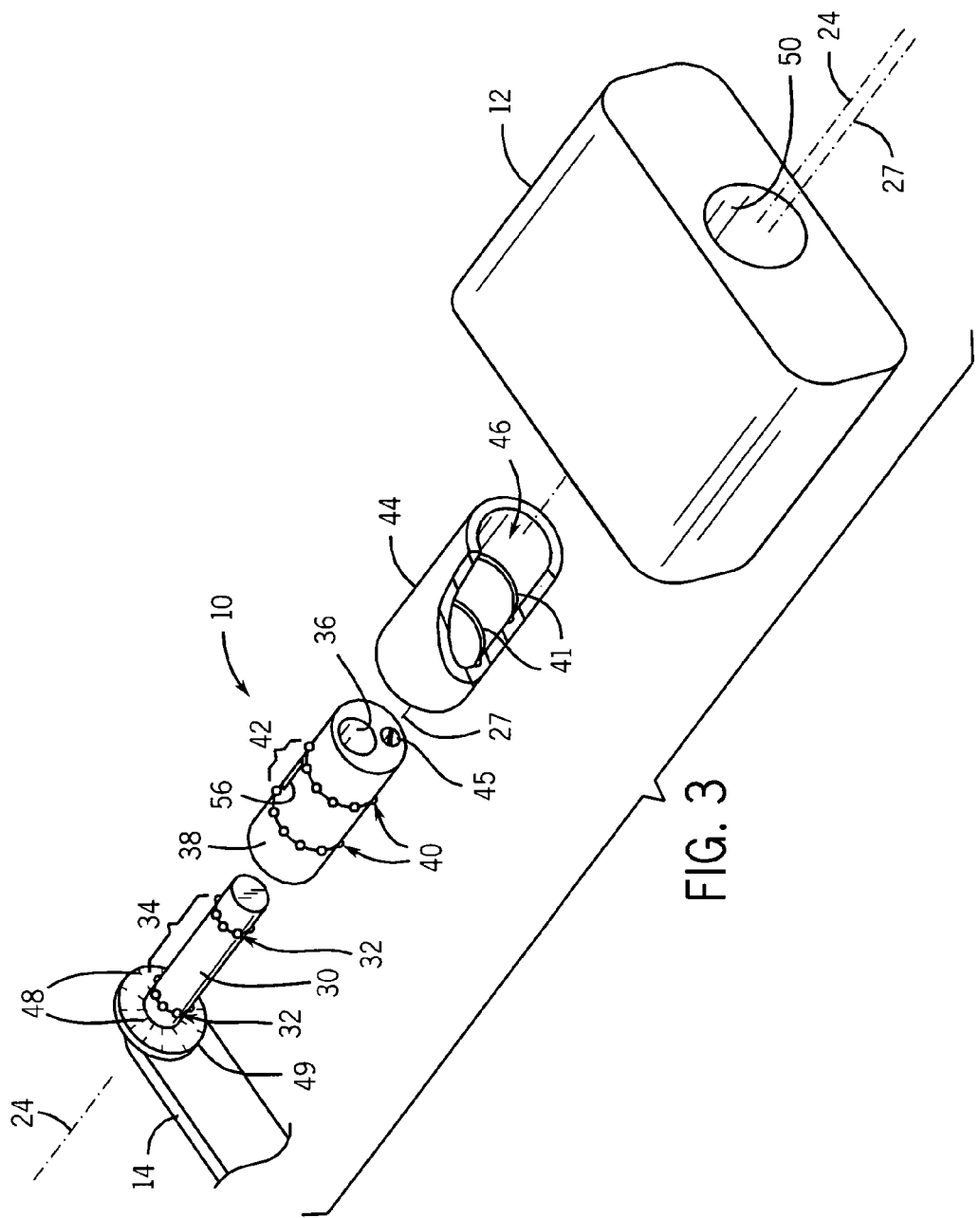
FIG. 3 is a cross-sectional view taken along line 3-3 of FIG. 1 showing rotation of the sensor in response to a force angle.

Referring flow to FIG. 3, the force sensor 10 may attach the pedal 12 to the crank arm 14 by means of a shaft 30 extending along the first axis 24 and having two bearings 32 (here shown as ball bearings held by circumferential races) positioned at either end of the shaft 30 at a separation distance 34 equally spaced from a mid point between the ends of the shaft 30. The shaft 30 and bearings 32 may fit within the bore 36 of an eccentric 38, the eccentric 38 being generally a cylinder with the bore 36 aligned with the first axis 24 of the shaft 30, but offset from a second parallel axis 27 of the cylinder so that the outer circumference of the cylinder is eccentric about the bore 36. The bore 36 includes races (not shown) completing the bearings 32.

An outer end of the eccentric 38 toward the crank arm 14 may abut an encoder disk 49 extending radially about the shaft 30 and attached to the crank arm 14. As will be described below, the eccentric 38 may expose two photo sensor/detector pairs 62 that may read 90-degree-phase separated encoder pattern 48 imprinted on the encoder disk 49 allowing electronics within the eccentric 38 to detect rotation of the eccentric 38 with respect to the shaft 30.

The outer circumference of the eccentric 38 may support bearings 40 equally spaced from a common mid point with the shaft 30 between the ends of the eccentric 38 but at a separation distance 42 less than separation distance 34.

Eccentric 38 and the bearings 40 may fit within support sleeve 44 being a cylindrical tube having a central opening 46 receiving the eccentric 38, and providing for corresponding races 41 completing the bearings 40. The sleeve 44 press fits within a corresponding bore 50 of the pedal 12.

Figure 2:
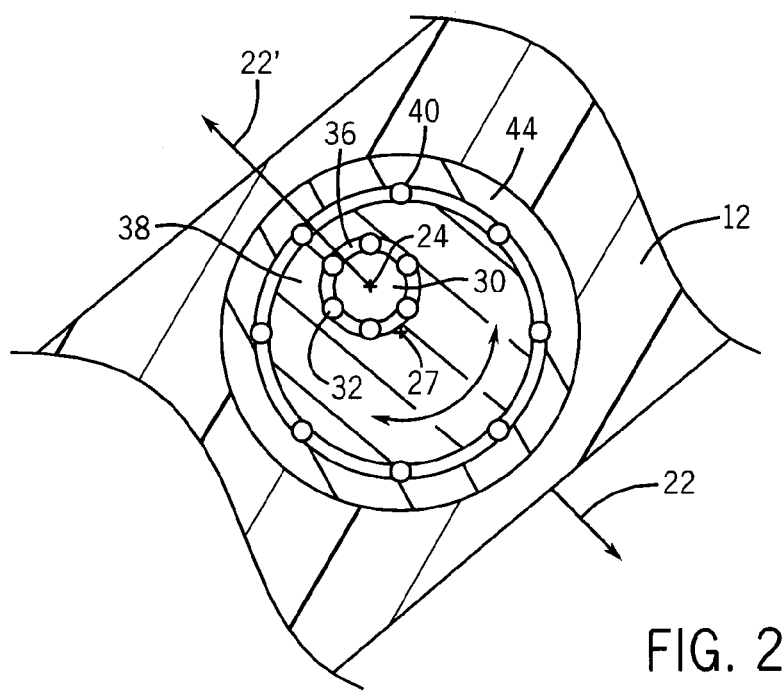
FIG. 2 is an exploded, perspective view of the sensor of FIG. 1 as held within the pedal.

Referring now to FIG. 2, force 22 on pedal 12 causes rotation of the eccentric 38 within the sleeve 44 about second axis 27 as the outer circumference of the eccentric 38 is pressed in the direction of the force 22 and the bore 36 of the eccentric 38 is pressed in an opposite direction by a resisting force 22' from the shaft 30. The result is to align the center of the shaft 30 along the first axis 24 and the center of the eccentric 38 along the second axis 27 along the line of force 22 with the axes 24 and 27 at their greatest separation. Thus, a radial line from first axis 24 to the second axis 27 will always be aligned with the force 22. Rotation of the eccentric 38 thus reveals the angle of the force 22. Other methods of detecting the relative rotation of the eccentric 38 with respect to the crank arm 14 or other structure will be understood to those of ordinary skill in the art.

Figure 4:
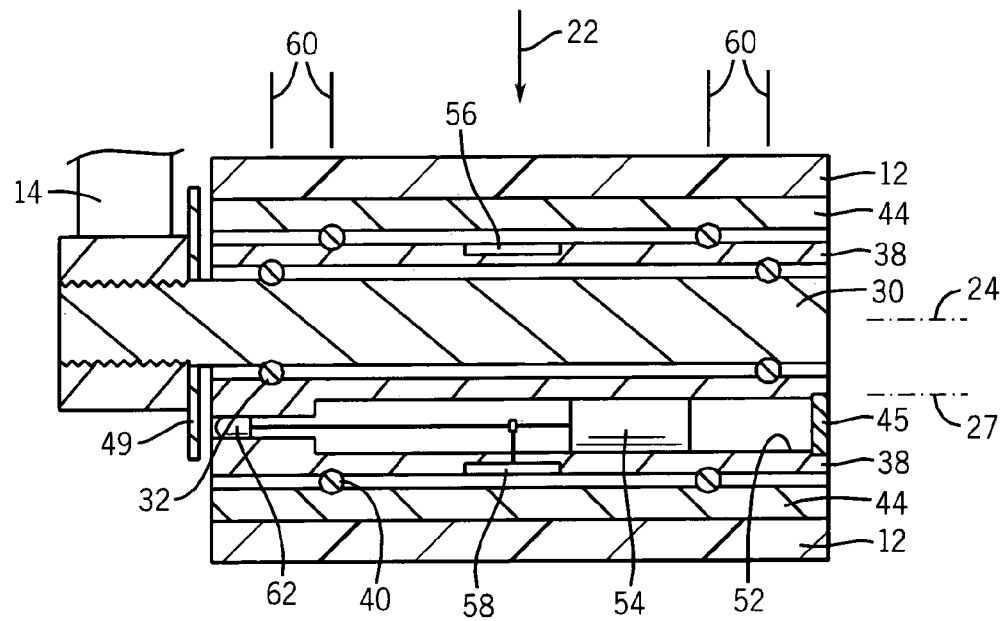
FIG. 4 is a cross-section perpendicular to the cross-section of FIG. 3 along a line of force showing rotation and strain sensing circuit elements of the sensor.

Referring now to FIGS. 3 and 4, an outer end of the eccentric 38, furthest from the crank arm 14, may include a threaded access cover 45 providing access to interior control electronics 54 communicating with an upper strain gauge 56 and a lower strain gauge 58 applied to the outer circumference of the eccentric 38 aligned with the radial line from first axis 24 to the second axis 27. Thus, for a given force 22, the upper strain gauge 56 may measure a compressing strain of strain gauge 56 and expanding strain of strain gauge 58 as a result of fulcrum points 60 formed by the bearings 32 and 40 previously described. Control electronics 54 may also communicate with photo sensor/detector pairs 62 exposed from the inner end of the eccentric 38 toward the crank arm 14 to view the encoder disk 49 to detect rotation of the eccentric 38 with respect to the crank arm 14.

Figure 5:
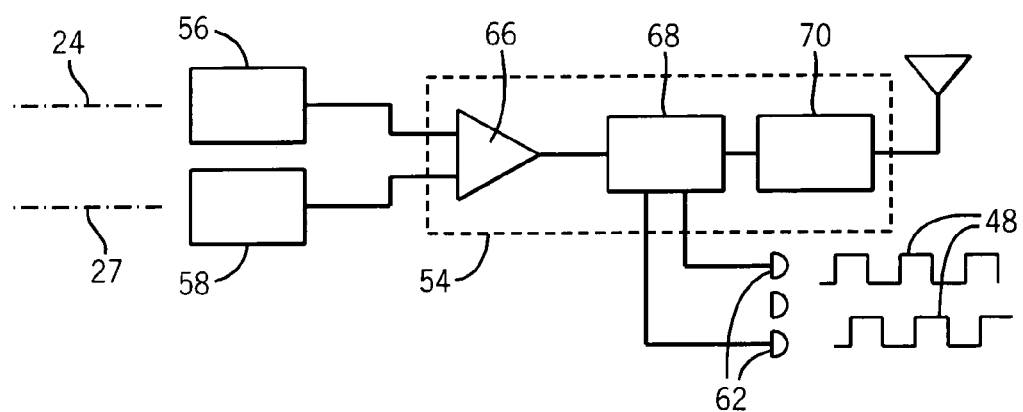
FIG. 5 is a schematic diagram of the circuit elements of FIG. 4.

Referring now to FIG. 5, the resistance of the strain gauges 56 and 58 may be subtracted, for example, using a Wheatstone bridge network (not shown) communicating with a differential amplifier 66 to produce a measurement of the magnitude of the force 22 along a radial line from first axis 24 to the second axis 27 based on known relationships between stress and strain of the eccentric 38 such as may be empirically determined. A microcontroller 68 may receive this force measurement and signals from the photo sensor/detector pairs 62 viewing encoder pattern 48 to deduce force angle and magnitude. This force angle and magnitude may be provided to a local transmitter 70 for transmitting this information wirelessly to a remote sensor. Absolute force angle may be determined by a rotation sensor (described below) determining the location of the pedal 12, and thus the relative rotation of the shaft 30 and encoder disk 49 to which the force angle measurement is referenced.

In an alternative embodiment, the magnitude of the force can be determined indirectly from a measurement of torque on the crank assembly 16 or at other points in the force transmission path.

Figure 6:
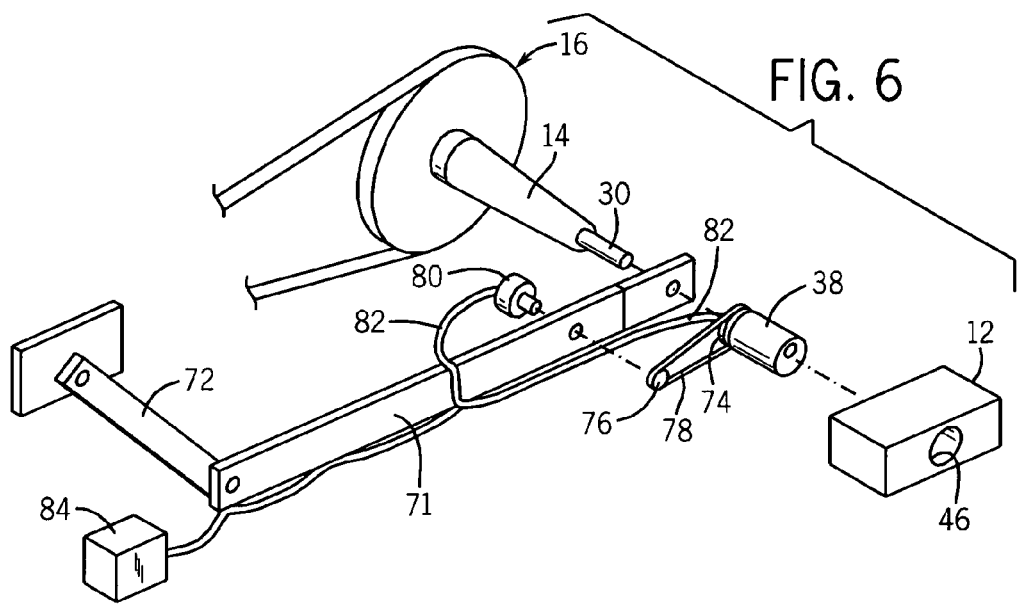
FIG. 6 is a simplified exploded perspective view with an alternative embodiment of the present invention providing wire connections to the sensor elements.

Referring now to FIG. 6, in an alternative embodiment, direct wiring of sensor data to a stationary processor 84 may be accomplished by using a follower 71 which may attach pivotally at one end to the crank arm 14 by fitting about the shaft 30, and which may attach pivotally at the other end to an idler arm 72 of equal length and angle to the crank arm 14. The follower 71 thus forms part of a four bar linkage in which follower 71 may move with a known angular relationship (e.g., constant horizontal orientation) to follow shaft 30 and provide a reference frame for measuring rotation of the eccentric 38. The encoder disk 49 may be mounted to the follower, or in a second embodiment as shown, the outer circumference of eccentric 38 may form a cog pulley 74 at its inner end communicating with a second cog pulley 76 by means of belt 78 to turn a standard rotary encoder 80 attached to the follower 71.

Insofar as the pedals 12 can generally maintain a relatively narrow angular range with respect to the follower 71, enforce, for example, with a guide slot on the follower 71, the strain gauges 56 and 58 and rotary encoder 80 can be directly wired by means of wires 82 along follower 71 to the stationary processor 84 without the need for wireless connection.

Figure 7:
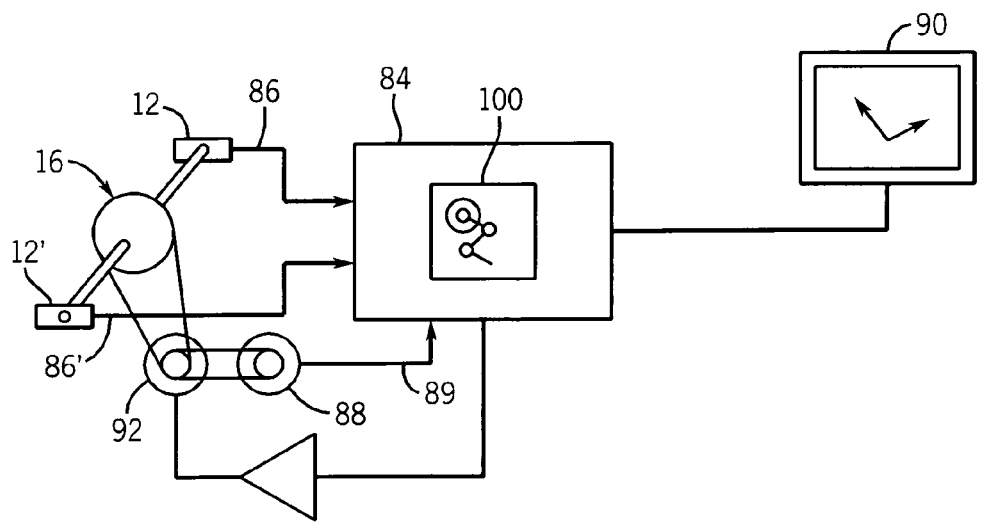
FIG. 7 is a block diagram of a control device using a kinematic model of the limb to deduce muscle activation patterns from force magnitude and angle provided by the present invention.

Referring now to FIG. 7, signals 86 and 86', each providing force angle and magnitude, may be obtained from each of two pedals 12 and 12' on crank assembly 16 and provided to stationary processor 84. The information about force magnitude and force angle may be displayed on a display 90 attached to the stationary processor 84, for example, as a vector diagram, or in any number of well known graphical representations. The display of the data of signals 86 and 86' on display 90 may be used to encourage the user to activate certain muscles by producing a particular force angle as opposed to simply a force magnitude as described generally in U.S. application Ser. No. 11/231,644 filed Sep. 21, 2005, hereby incorporated by reference, and assigned to the same assignee as the present invention.

Force magnitude and angle may also be used to evaluate left/right asymmetries found in all users and of particular interest following injury and recovery.

In addition, crank position may be detected through position encoder 88 and provided to the stationary processor 84, either to assist in determining absolute force angle, or to provide information about muscle activation patterns as will be described below.

Generally, the stationary processor 84 may control an actuator 92 communicating with the crank assembly 16 for providing resistance or opposing force pedals 12, either as a constant resistance or a varying force as a function of the position signal 89 and the force magnitude and angle signals 86 and 86' also as described in the above referenced co-pending application.

In one embodiment, the stationary processor 84 may include a kinematic model 100 of the limb 20 used to actuate the pedals 12. This model 100, providing for joints, bone lengths, and muscle group attachment points, may be used with the position signal 89 and the force angle and magnitude of signals 86 and 86', to deduce the particular muscle groups being activated by the user. The display 90 may also provide information about the exercise of particular muscle groups and, thus may provide guidance to the user about efficient use of muscles in pedaling.

This muscle group activation information may also be used to limit exercise of particular muscles in favor of other muscles by controlling the actuator 92 to reduce force for some muscle groups and increase it for others on a real-time basis. This may be used for rehabilitation purposes when a particular muscle should not be exercised, yet cardiovascular exercise of the limb is generally desired, or for customizing the training system to train particular muscles that differ from those normally trained by a constant resistance of a stationary bike or the like.

The ability to determine the usage of different muscle groups may be used to provide a bike-fitting system that may evaluate the proper human-machine geometry for optimal exercise or biking. By determining the actual muscle usage pattern through the use of the model 100, the user is prevented from being able to favor particular muscles over the one requiring exercise through adoption of a different muscle activation pattern.

The present inventors have determined that generally, for the case of bicycling, users tend to adopt a muscle usage pattern that matches that which would be required for walking rather than that which is easiest or most efficient for propelling the crank assembly. The present invention could be used for retraining users for efficient bicycling.

It is specifically intended that the present invention not be limited to the embodiments and illustrations contained herein, but include modified forms of those embodiments including portions of the embodiments and combinations of elements of different embodiments as come within the scope of the following claims.

We claim:

1. A sensor for measuring a force magnitude and force angle of a force acting on a member, the sensor comprising:
   a rotating element mounted on the member to rotate according to a force angle of a force applied through the rotating element to the member;
   a rotation sensor providing an electronic measurement of the rotation of the rotating element to reveal the force angle; and
   a force sensor providing a measurement of force magnitude of the force;
   wherein the rotating element has a first bearing along a first axis for receiving a shaft to rotate about a first axis along the shaft, and has a second bearing along a second axis parallel to, but displaced from, the first axis for rotating with respect to an operator, and wherein the force is applied between the operator and the shaft.

2. The sensor of claim 1 wherein the force sensor is a single axis force sensor mounted on the rotating element to rotate therewith to alignment with the force angle.

3. The sensor of claim 1 wherein the shaft is attached to the member.

4. The sensor of claim 1 wherein the shaft fits within a bore of the rotating element to form the first bearing, and the rotating element fits within a bore of the operator to form the second bearing.

5. The sensor of claim 4 wherein the first bearing provides at least two axially separated fulcrum points, and the second bearing provides at least two axially separated fulcrum points so that one set of fulcrum points flanks the other.

6. The sensor of claim 1 wherein the force sensor is at least one strain gauge.

7. The sensor of claim 1 wherein the member is a crank arm of a bicycle.

8. The sensor of claim 1 including a display device attached to the rotation sensor and force sensor to provide visual feedback to indicate force magnitude and angle.

9. The sensor of claim 1 including an actuator that controls motion of the member and receives signals from the rotation sensor and force magnitude sensor to modify resistance of the member as a function of the force angle.

10. A pedal training system comprising:
    a seat supporting a user;
    a pedal support attached to pedals for engaging a user's left and right foot for movement of the pedal support when the user is supported by the seat;

at least two rotating elements, one mounted to each of two crank arms to rotate according to a force angle of a force applied to the pedals independent of the user's foot orientation;

a rotation sensor associated with each rotating element providing an electronic measurement of the rotation of the rotating element to reveal the force angle; and a single axis force sensor mounted on the rotating element to rotate therewith in alignment with the force angle.

11. The training system of claim 10 including a computer attached to the rotation sensor and force sensor to calculate efficiency of force application.

12. The training system of claim 10 including an actuator that controls motion of the pedal support and receives signals from the rotation sensor and force sensor to modify resistance of the pedal support as a function of the force angle.

13. The training system of claim 10 including a display device attached to the rotation sensor and force sensor to provide visual feedback to indicate force and angle.

14. The training system of claim 10 including a computer attached to the rotation sensor and force sensor to detect asymmetry in force application of the left and right foot.

* * * * *